(12) United States Patent
Rovik

(10) Patent No.: US 9,067,489 B2
(45) Date of Patent: Jun. 30, 2015

(54) SYSTEM AND METHOD OF PREVENTING INADVERTENT CHECK ENGINE TELLTALE

(75) Inventor: Christopher Lee Rovik, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 193 days.

(21) Appl. No.: 13/555,881

(22) Filed: Jul. 23, 2012

(65) Prior Publication Data

US 2012/0319830 A1    Dec. 20, 2012

Related U.S. Application Data

(63) Continuation-in-part of application No. 11/869,163, filed on Oct. 9, 2007, now abandoned.

(51) Int. Cl.
*B60Q 1/00* (2006.01)
*B60K 15/05* (2006.01)
*B60Q 9/00* (2006.01)

(52) U.S. Cl.
CPC ......... *B60K 15/05* (2013.01); *B60K 2015/0546* (2013.01); *B60Q 9/00* (2013.01); *B60K 2015/053* (2013.01)

(58) Field of Classification Search
None
See application file for complete search history.

(56) References Cited

U.S. PATENT DOCUMENTS

| 1,692,288 A | 11/1928 | Clarke |
| 4,462,185 A | 7/1984 | Shibuki et al. |
| 4,583,072 A | 4/1986 | Matsushita |
| 4,612,729 A | 9/1986 | Sato |
| 4,858,971 A | 8/1989 | Haag et al. |
| 5,155,937 A | 10/1992 | Yamagishi et al. |
| 5,538,312 A | 7/1996 | Lehmkuhl |
| 5,551,190 A | 9/1996 | Yamagishi et al. |
| 6,007,141 A | 12/1999 | Thomas et al. |
| 6,079,767 A | 6/2000 | Faubert et al. |

(Continued)

FOREIGN PATENT DOCUMENTS

| JP | 09323555 A | 12/1997 |
| JP | 10-129279 A | 5/1998 |

(Continued)

OTHER PUBLICATIONS 1992-224215, Jun. 1992, Derwent, Saller.*

(Continued)

*Primary Examiner* — John A Tweel, Jr.
*Assistant Examiner* — Brian Wilson
(74) *Attorney, Agent, or Firm* — Gifford, Krass, Sprinkle, Anderson & Citkowski, P.C.

(57) ABSTRACT

A system for preventing the illumination of a vehicle check engine light by notifying the driver that the fuel door is not closed. The system includes an interference member, a sensor for detecting the position of a fuel door, and a processor to communicate a detectable signal to the driver. The interference member prevents the fuel door from closing if the fuel cap is not properly seated in the fuel injection port, and the sensor detects the position of the door. The sensor can communicate the position of the door to the processor which in turn can send a detectable signal to the driver that the fuel door is ajar and the fuel cap is loose. Furthermore, in vehicles equipped with power slide doors, the processor can also disable the operation of the power slide door to prevent the power slide door from colliding with the fuel door.

11 Claims, 5 Drawing Sheets

(56) References Cited

U.S. PATENT DOCUMENTS

| | | |
|---|---|---|
| 6,234,557 B1 | 5/2001 | Bae |
| 6,260,544 B1 | 7/2001 | Spry et al. |
| 6,270,148 B1 | 8/2001 | Noda et al. |
| 6,352,295 B1 | 3/2002 | Leitner |
| RE37,776 E | 7/2002 | Foltz |
| 6,588,829 B2 | 7/2003 | Long et al. |
| 6,745,914 B2 | 6/2004 | Hagano et al. |
| 6,793,266 B2 * | 9/2004 | Park .......................... 296/97.22 |
| 6,808,226 B2 | 10/2004 | Hirano |
| 6,922,622 B2 | 7/2005 | Dulin et al. |
| 6,935,071 B2 | 8/2005 | Yokomori et al. |
| 6,994,392 B2 | 2/2006 | Seto |
| 7,165,583 B1 | 1/2007 | Walkowski et al. |
| 7,195,093 B1 | 3/2007 | Ahmadi |
| 2002/0162601 A1 | 11/2002 | Jin et al. |
| 2005/0280276 A1 | 12/2005 | McComsey |
| 2007/0107313 A1 | 5/2007 | Suzuki et al. |
| 2009/0314072 A1 * | 12/2009 | Slusser et al. ............. 73/114.43 |
| 2010/0121551 A1 * | 5/2010 | Boss et al. ..................... 701/99 |

FOREIGN PATENT DOCUMENTS

| | | | | |
|---|---|---|---|---|
| JP | 11-078527 | * | 3/1999 | ............... B60J 5/06 |
| JP | 11078527 A | | 3/1999 | |
| JP | 2005178629 A | | 7/2005 | |
| JP | 2006169718 A | | 6/2006 | |
| JP | 2006327225 A | | 12/2006 | |
| KR | 20030012601 A | | 2/2003 | |
| KR | 20040009403 A | | 1/2004 | |
| KR | 20040016737 A | | 2/2004 | |

OTHER PUBLICATIONS

Sallier, Gas filler cap includes two raised convex sections on its top each having distinctly different shapes and mirror shapes of concaved identations located on inside of gas filler cap door, Jun. 10, 1992, Derwent, RD 338013 A, pp. 1-2, and drawings.

* cited by examiner

SYSTEM AND METHOD OF PREVENTING INADVERTENT CHECK ENGINE TELLTALE

CROSS-REFERENCE TO RELATED APPLICATIONS

This application is a Continuation-in-part of application Ser. No. 11/869,163 filed on Oct. 9, 2007, the contents of which are incorporated herein by reference, in its entirety.

FIELD OF THE INVENTION

A system and method of eliminating the illumination of a vehicle's check engine light due to a loose fitting between a vehicle's fuel cap and a fuel injection port. More particularly, a system and method of notifying a driver that a vehicle's fuel cap may be loose because the fuel door is ajar using only one sensor.

BACKGROUND OF THE INVENTION

Vehicles are typically equipped with a check engine light which notifies the driver that there may be a problem with the operation of the vehicle's engine. Such lights are illuminated when the vehicle's emission sensor determines that the engine may not be running in compliance with predetermined fuel emission standards. However, illumination may occur even when the engine is operating within predetermined emission standards because of a loose fuel cap. Currently, some vehicles are equipped with a sensor to detect the position of the fuel door, and some are equipped with a different sensor to determine if the fuel cap is loose. However, the addition of a second sensor increases vehicle manufacturing costs. Accordingly, it is desirable to have a system and method that can detect the position of a door and warn the driver that the fuel cap may be loose using only one sensor.

SUMMARY OF THE INVENTION

A system and method of warning a driver that the fuel door is open and that the fuel cap may be loose utilizing a sensor, an interference member, and a processor. The interference member can be either a pad fixed to the interior of the fuel door, or a protruding member of a fuel cap such that the fuel door cannot close unless the fuel cap is properly seated in the fuel injection port. The sensor detects the position of the fuel door and communicates the fuel door position to the processor. If the fuel door is open and the vehicle is started, the processor provides the driver with a detectable signal that the fuel door is open and the fuel cap may be loose.

The system and method may also be used to control other vehicle features. For example, system and method may render a power slide door inoperable to prevent the power slide door from colliding with an open fuel door. This can be done two ways: 1) the sensor can communicate to the processor and the processor can control the power slide door as well as provide the driver with a detectable signal warning the driver that the fuel door is open and to check the fuel cap; or 2) the sensor can communicate directly with the power slide door and render it inoperable when the fuel door is open.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
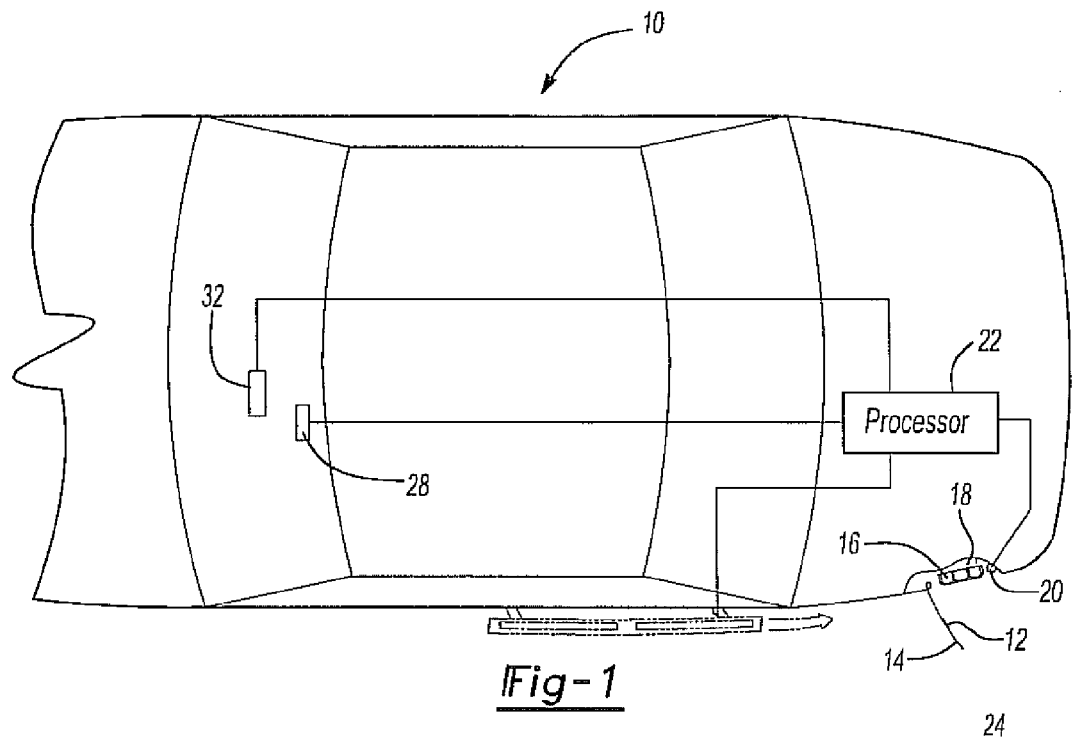
FIG. 1 is a top down view of a vehicle having a system for detecting if a fuel cap is not properly seated in a fuel injection port.

An embodiment of a system 10 for preventing the inadvertent actuation of a vehicle check engine light is provided in FIG. 1. The system 10 is configured to prevent the inadvertent actuation of the check engine light using only one sensor. The system is further configured to warn a driver that a fuel cap 16 may not be fully seated in a fuel injection port 18 of a vehicle. The system includes an interference member 12, a sensor 20, and a processor 22. The sensor 20 communicates with the processor 22.

Figure 2:
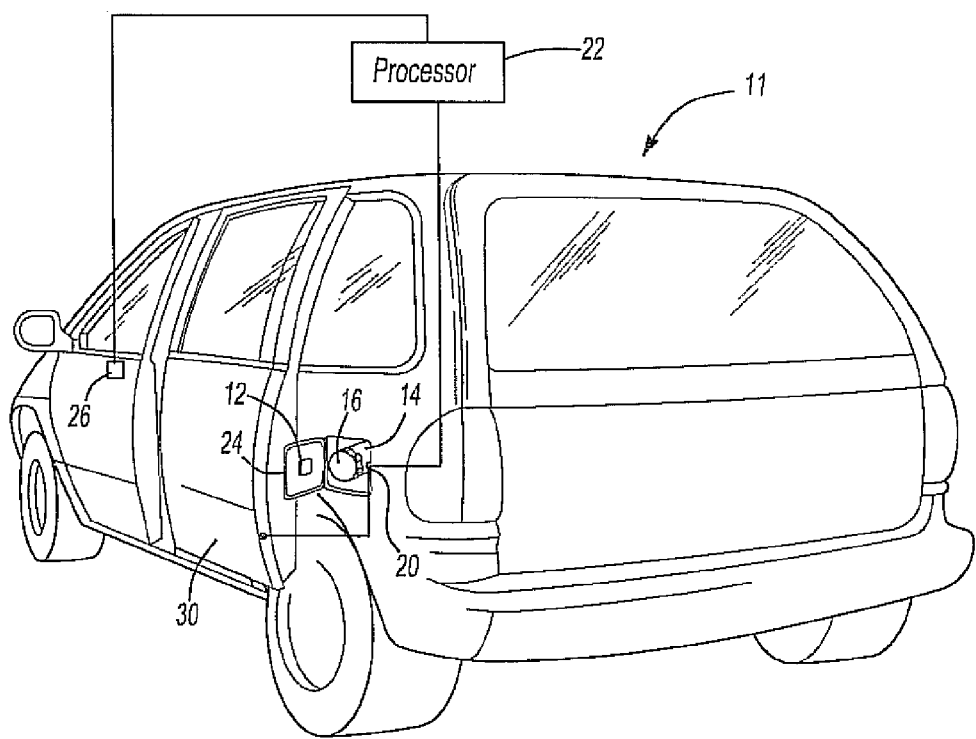
FIG. 2 is a perspective view of the vehicle of FIG. 1.

With reference now to FIG. 2, the fuel injection port 18 is disposed within a fuel injection port housing assembly 15. The fuel injection port housing assembly 24 includes a fuel door 14 pivotably mounted to an opening of the fuel injection port housing assembly 24. The fuels door 14 includes an inner surface 14a disposed within the fuel injection port housing assembly 24 when the fuel door 14 is closed. The sensor 20 is positioned in the space between the fuel injection port 18 and a closed fuel door 14. The sensor 20 detects the position of the fuel door 14.

Figure 7:
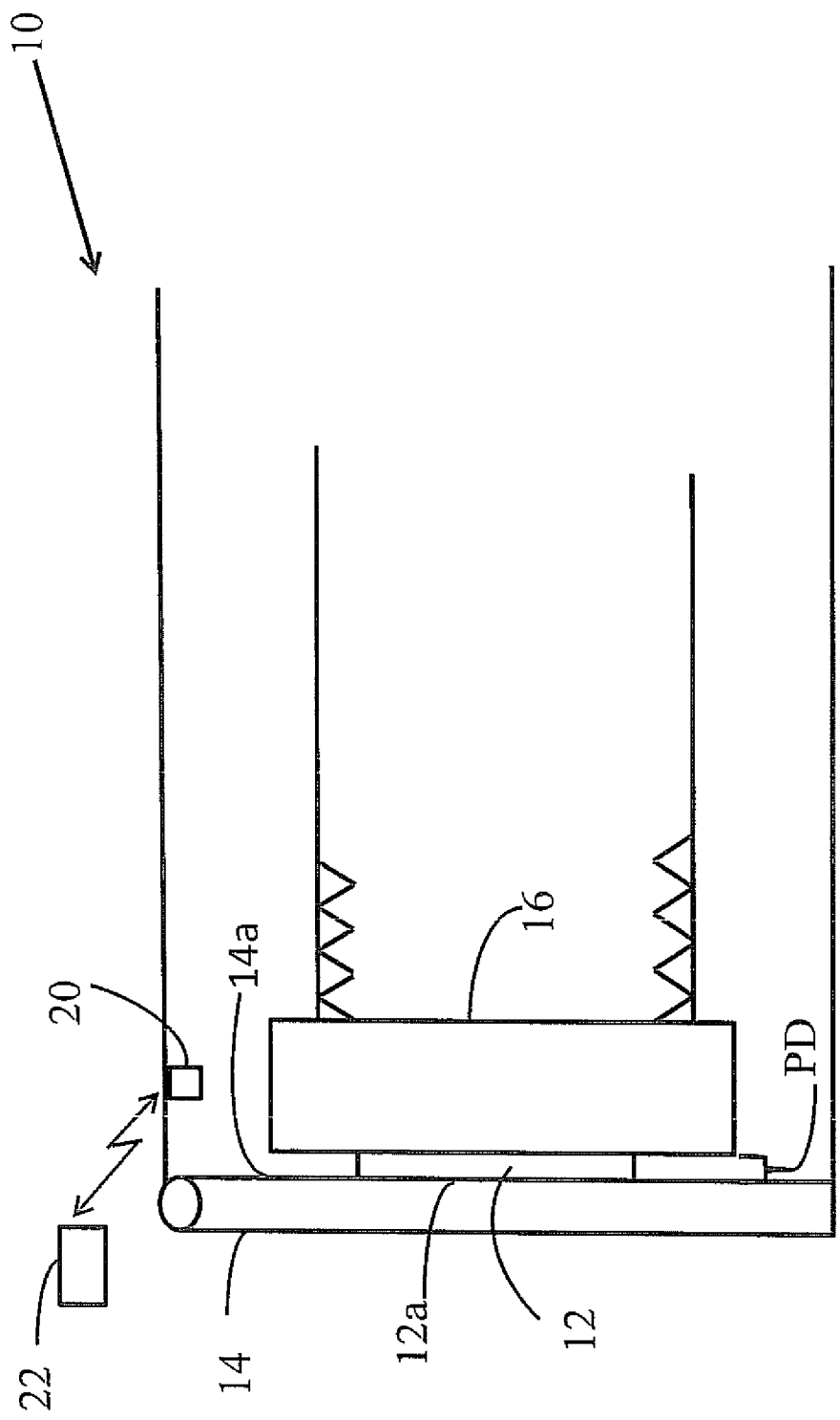
FIG. 7 is a cross-sectional view of the injection port housing assembly showing the fuel door closed, and the interference member contacting the outer surface of the fuel cap.
Figure 8:
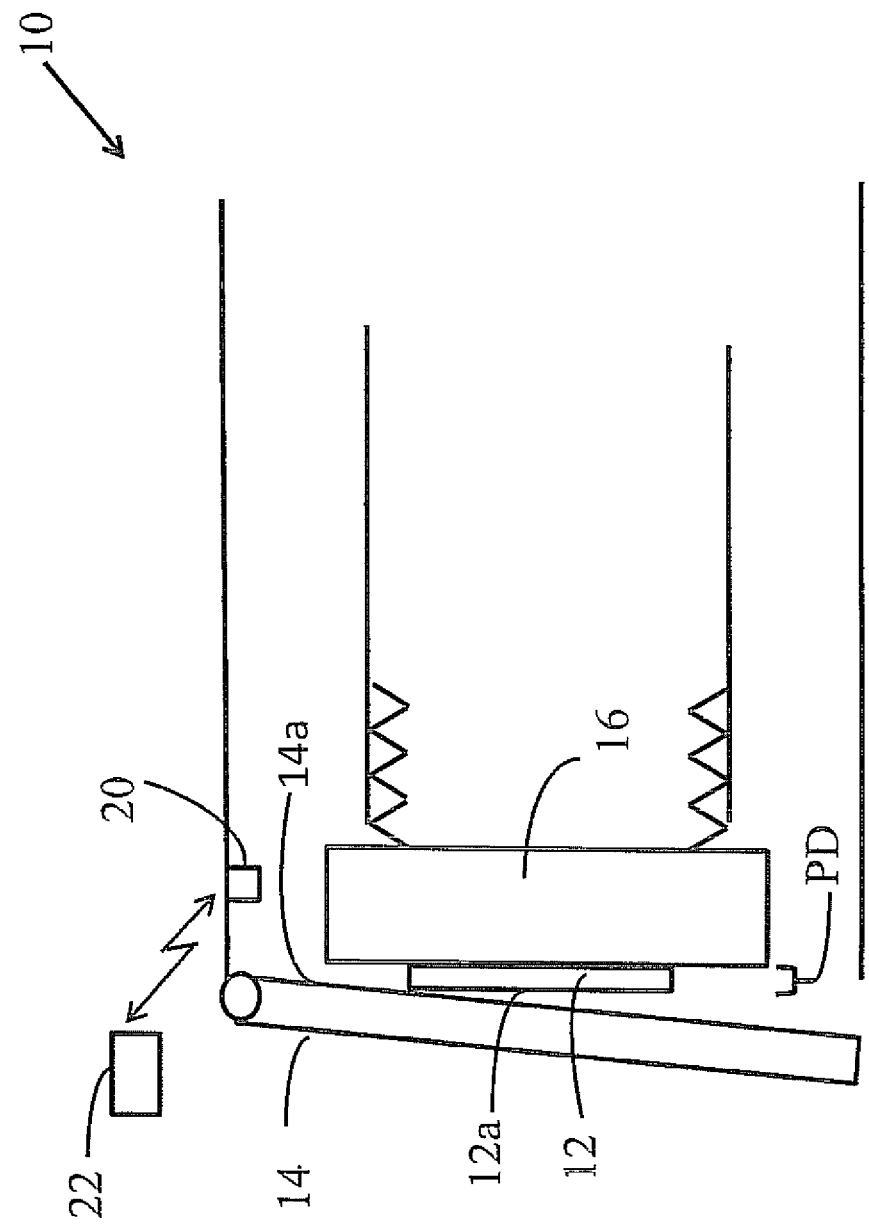
FIG. 8 is a cross-sectional view of FIG. 7, showing the interference member preventing the fuel door from closing because the fuel cap is not properly seated.

With reference again to FIG. 2, and now to FIGS. 7 and 8, the operation of the system 10 is provided. The interference member 12 has a contact surface 12a and is configured to prevent the fuel door 14 from closing if the fuel cap 16 is not fully seated on the fuel injection port 18. More specifically, the contact surface 12a is displaced a predetermined distance, as indicated by "PD", from the inner surface 14a of the fuel door 14. The predetermined distance is equal to the distance from the inner surface 14a of the fuel door 14 and the outer surface of the fuel cap 16 when the fuel door 14 is closed and the fuel cap 16 is fully seated within the fuel injection port 18. Accordingly, the interference member 12 will not allow the fuel door 14 to close every time the fuel cap 16 is not fully seated within the fuel injection port 18.

The sensor 20 communicates the position of the fuel door 14 to the processor 22. If the ignition switch 26 is on, the processor 22 sends a detectable signal 28 to the driver that the fuel door 14 is ajar and to check the fuel cap 16. Additionally, the processor 22 may be able to control other vehicle functions, such as the operation of a power slide door 30, regardless of whether the ignition switch 26 is on or off. Accordingly, the system 10 is configured to prevent the check engine light from illuminating every time the fuel cap 16 is not fully seated within the fuel injection port 18.

An alternative embodiment of a system 10 for warning a driver that a fuel cap may not be fully seated in a fuel injection port of a vehicle having an interference member 12, a sensor 20, and a processor 22 where the sensor 20 communicates with the processor 22 and a power slide door 30 is shown in FIG. 2. The sensor 20 is positioned in the space between the fuel injection port 18 and a closed fuel door 14. The sensor 20 detects the position of the fuel door 14. The interference member 12 prevents the fuel door 14 from closing if the fuel cap 16 is not fully seated on the fuel injection port 18. More specifically, the contact surface 12a is displaced a predetermined distance from the inner surface 14a of the fuel door 14. The predetermined distance equal to the distance from the inner surface 14a of the fuel door 14 and the outer surface of the fuel cap 16 when the fuel door 14 is closed and the fuel cap 16 is fully seated within the fuel injection port 18, as shown in FIG. 7.

With reference again to FIG. 8, the fuel cap 16 is not fully seated within the fuel injection port 18, as indicated by the exposed threaded outer surface of a male member of the cap adapted to threadedly engage the fuel injection port 18. The contact surface 12a of the fuel cap 12 engages the inner surface 14a of the fuel door 14, so as to displace the fuel door from a closed position.

The sensor 20 detects and communicates the position of the fuel door 14 to the processor 22. If the vehicle ignition (not shown) is turned on and the fuel door 14 is open, the processor 22 sends a detectable signal 32 to the driver that the fuel door 14 is ajar and to check the fuel cap 16. Additionally, the sensor 20 communicates the position of the fuel door 14 directly to the power slide door 30 regardless of whether the vehicle ignition switch 28 is on or off. If the sensor 20 detects that the fuel door 14 is open, then the sensor 20 renders the power slide door 30 inoperable.

The sensor 20 detects the position of the fuel door 14, and communicates the position of the fuel door 14 to the processor 22. FIGS. 1 and 2 show the sensor 20 positioned in the space between the fuel injection port 18 and a closed fuel door 14. However, the sensor 20 can be positioned at other locations in the vehicle. The sensor 20 is one known and used in the art such as a piezoelectric sensor, electromagnetic sensor, or a strain gauge. Accordingly, it will be appreciated to those skilled in the art that the sensor 20 will be placed in accordance with the sensor's 20 capabilities and requirements.

The processor 22 is capable of controlling other vehicle outputs. For example, if the vehicle ignition switch 28 is turned on, the processor 22 sends a textual display 32 warning that fuel door 14 is open and that the fuel cap 16 may be loose to the driver. Additionally, the processor 22 can disable the operation of a power slide door 30 if the fuel door 14 is open, regardless of whether the ignition switch 28 is on. The processor 22 is one known and used in the art.

Figure 6:
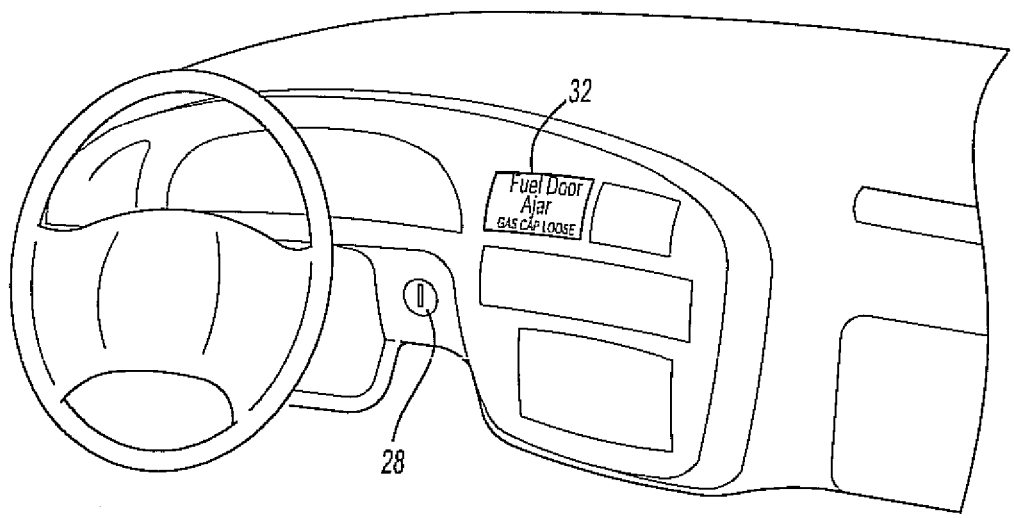
FIG. 6 is a perspective view of the textual display shown in the cabin space of a vehicle.

The detectable signal 32 can be a textual display appearing on an instrument panel of a vehicle, or a text message appearing on a screen a navigation system as shown in FIGS. 1 and 6. The detectable signal 32 can also be a prerecorded message to the driver, that verbally warns the driver that the fuel door 14 is open and to check the fuel cap 16.

Figure 3:
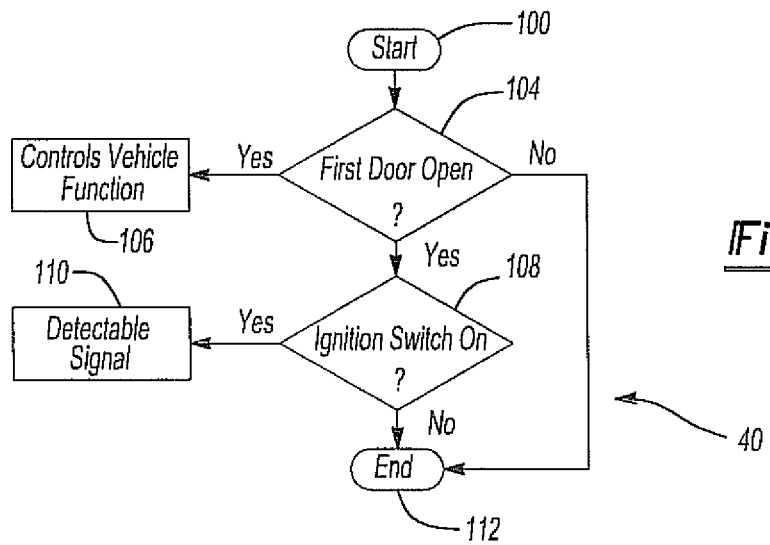
FIG. 3 is a diagram showing a method for preventing the inadvertent actuation of a vehicle's check engine light.

A method of preventing the vehicle check engine light from activating due to gasoline fumes escaping from a loose fuel cap 16 while the vehicle engine is operating using a sensor 20 is shown in FIG. 3. The methodology disclosed comprising preventing a fuel door 14 from closing by having an interference member 12 come into contact with a fuel cap 16 when the fuel cap 16 is not properly seated in the fuel injection port 18; detecting the position of the fuel door 14 with a sensor 20; and warning a driver that the fuel door 14 is open and to check the fuel cap 16 if the vehicle ignition switch 28 is on. The methodology begins at bubble 100 and progresses to decision block 104 where the sensor 20 determines if the fuel door 14 is open. If the fuel door 14 is closed, then the methodology ends at bubble 112. If the sensor 20 detects that the fuel door 14 is open, the methodology proceeds to block 108 where the processor 22 having received a signal from the sensor 20 that the fuel door 14 is open, determines if the ignition switch 28 is on. If the ignition switch 28 is on, the methodology proceeds to block 110 where a detectable signal 32 is delivered to the driver warning the driver that the fuel door 14 is ajar and that the fuel cap 16 may be loose. Additionally, the methodology may also proceed to block 106 if the sensor 20 determines that the fuel door 14 is open. In such cases, the sensor 20 directly controls a vehicle function such as disabling the operation of a power slide door 30.

Figure 4:
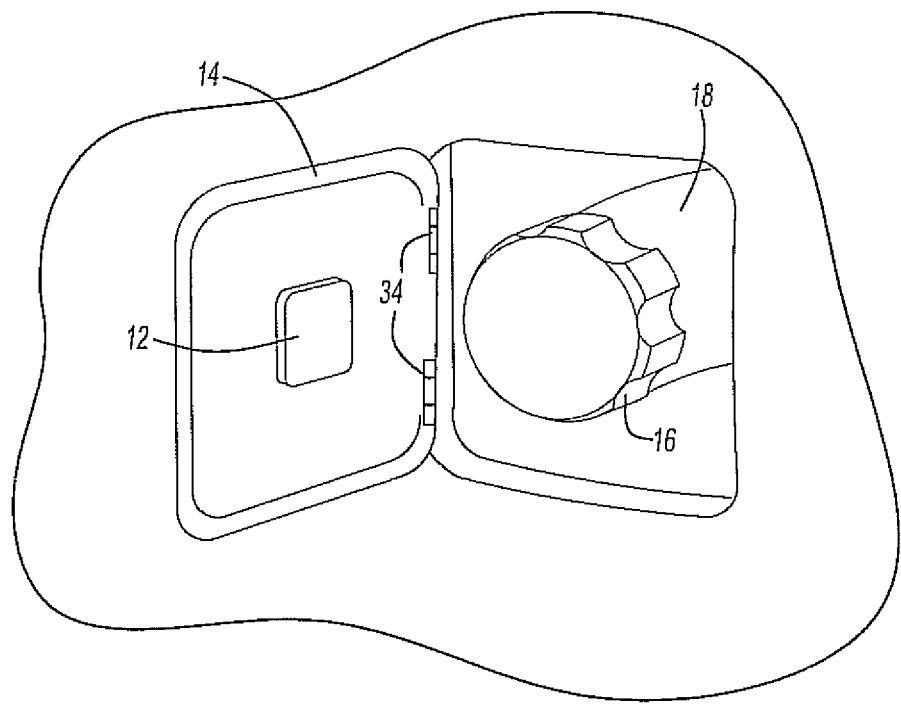
FIG. 4 is a perspective view of an interference member mounted to the fuel door.

An embodiment of an interference member 12 that prevents a fuel door 14 from closing if the fuel cap 16 is not fully seated in a fuel injection port is shown in FIG. 4. In this embodiment, the interference member 12 is attached to the interior of a fuel door 14 installed in a fuel injection port housing assembly. The fuel injection port housing assembly having an interference member 12, a fuel door 14, fuel cap 16, and fuel injection port 18. The fuel door 14 is hinged 34 pivotably onto the body of the vehicle such that the fuel door 14 is flush with the vehicle body when closed. The fuel door 14 has an inner and exterior surface, and the interference member 12 has a contact surface 12a. The interference member 12 is shaped like a pad and is fixed to the interior surface of the fuel door 14. The fuel injection port 18 has a male portion for receiving a fuel cap 16. The fuel cap 16 when fully seated onto the fuel injection port 18 allows for the fuel door 14 fixed with the interference member 12 to close. However, the interference member 12 protrudes from the interior surface of the fuel door 14 such that the interference member 12 will come into contact with the exposed surface of the fuel cap 16. More specifically, the contact surface 12a is displaced a predetermined distance from the inner surface 14a of the fuel door 14. The predetermined distance equal to the distance from the inner surface 14a of the fuel door 14 and the outer surface of the fuel cap 16 when the fuel door 14 is closed and the fuel cap 16 is fully seated within the fuel injection port 18. Thus, when the fuel cap 16 is not fully seated in the fuel injection port 18, the interference member 12 prevents the fuel door 14 from closing.

Figure 5:
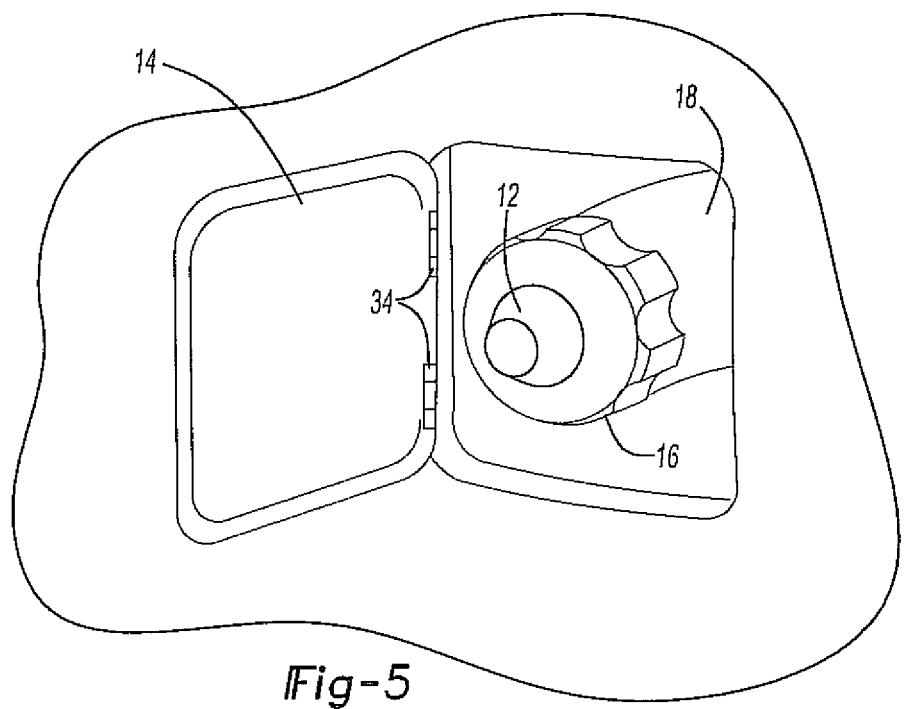
FIG. 5 is a perspective view of an interference member mounted to the fuel cap.

An alternative embodiment of an interference member 12 is shown in FIG. 5. In this embodiment, the interference member 12 is a protrusion on the exterior of a fuel cap 16 in a vehicle fuel injection port housing assembly. The vehicle fuel injection port housing assembly having an interference member 12, a fuel door 14, fuel cap 16, and fuel injection port 18. The fuel door is hinged 34 pivotably onto the body of the vehicle such that the fuel door 14 is flush with the vehicle body when closed. The fuel door 14 has an interior and exterior surface. The fuel injection port 18 having a male portion for receiving a fuel cap 16. The fuel cap 16 has an interference member 12 protruding from the exterior surface of the fuel cap 16. The fuel cap 16 when properly seated onto the fuel injection port 18 allows for the fuel door 14 to close. The interference member 12 will come into contact with the fuel door 14, when the fuel cap 16 is not properly seated in the fuel injection port 18, thus preventing the fuel door 14 from closing.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A system for use in a vehicle having a driver, an engine, an ignition switch, a check engine light and a fuel injection port housing, the fuel injection port housing having a fuel door and a fuel injection port, the system configured to prevent the check engine light from illuminating every time a fuel cap is not fully seated in the fuel injection port, the system comprising:
   an interference member disposed within the fuel injection port housing, the interference member having a contact surface displaced a predetermined distance from an inner surface of the fuel door, the predetermined distance equal to the distance from the inner surface of the fuel door and an outer surface of the fuel cap when the fuel door is closed and the fuel cap is fully seated within the fuel injection port, the interference member preventing a closure of the fuel door every time the fuel cap is not fully seated in the fuel injection port;
   a single sensor, the single sensor detecting if the fuel door is open and communicating a position of the open fuel door;
   a processor in communication with the single sensor, the processor processing the communication from the single sensor, and issuing a detectable signal based on only the communication from the single sensor while the engine is operating, the detectable signal indicating to the driver to check the fuel cap so as to prevent the check engine light from illuminating when the fuel cap is not fully seated within the fuel injection port.

2. A system as set forth in claim 1, wherein the single sensor is disposed within the fuel injection port housing.

3. A system as set forth in claim 1, wherein the ignition switch is configured to actuate the processor.

4. A system as set forth in claim 3, wherein the detectable signal indicates to check the fuel cap to see if the fuel cap is tightened within the fuel injection port.

5. A system as set forth in claim 4, wherein the detectable signal is a textual display.

6. A system as set forth in claim 4, wherein the detectable signal is a pre-recorded verbal warning.

7. A method of preventing a vehicle check engine light from activating due to gasoline fumes escaping from when a fuel cap is not fully seated within a fuel injection port while the vehicle engine is operating, the method comprising the steps of:
   providing an ignition switch, and a fuel injection port housing, the fuel injection port housing having a fuel door and the fuel injection port;
   providing an interference member having a contact surface displaced a predetermined distance from an inner surface of the fuel door, the predetermined distance equal to the distance from the inner surface of the fuel door and an outer surface of the fuel cap when the fuel door is closed and the fuel cap is fully seated within the fuel injection port, placing the interference member in the fuel injection port housing, the interference member preventing the fuel door from closing when the fuel cap is not fully seated within the fuel injection port by having the interference member come into contact with the outer surface of the fuel cap;
   providing a single sensor configured to detect when the fuel door is open; and
   sending a detectable signal to a driver based only on the single sensor detecting that the fuel door is open while the ignition switch is on and the vehicle engine is operating, the detectable signal warning the driver to check the fuel cap so as to prevent the check engine light from activating.

8. A method as set forth in claim 7, wherein the interference member is a pad fixed to the inner surface of the fuel door, the pad configured to prevent the fuel door from closing if the fuel cap is not fully seated within the fuel injection port.

9. A method as set forth in claim 7, wherein the detectable signal is a textual display notifying the driver that the fuel door is open and to check the fuel cap to see if the fuel cap is not fully seated within the injection port.

10. A method as set forth in claim 7, wherein the detectable signal is a prerecorded voice warning the driver that the fuel door is open and the fuel cap is not fully seated.

11. A method as set forth in claim 7, further including the step of providing a power sliding door on the vehicle, and wherein the single sensor is in communication with the power sliding door and is configured to disable the power sliding door when the fuel door is open.

* * * * *